United States Patent [19]

Innus et al.

[11] Patent Number: 4,842,255
[45] Date of Patent: Jun. 27, 1989

[54] DROSS COOLING APPARATUS

[75] Inventors: Andris B. Innus; Michel Villeneuve, both of Jonquiere, Canada

[73] Assignee: Alcan International Limited, Montreal, Canada

[21] Appl. No.: 925,741

[22] Filed: Oct. 30, 1986

[30] Foreign Application Priority Data

Nov. 1, 1985 [GB] United Kingdom ............... 8526969

[51] Int. Cl.$^4$ ................................................ F27D 9/00
[52] U.S. Cl. ....................................... 266/158; 266/251
[58] Field of Search ................ 266/44, 241, 158, 201, 266/251; 75/24

[56] References Cited

U.S. PATENT DOCUMENTS

| | | | |
|---|---|---|---|
| 4,097,027 | 6/1978 | Michel | 266/44 |
| 4,386,956 | 6/1983 | Roth et al. | 75/24 |
| 4,637,591 | 1/1987 | McMahon et al. | 266/227 |

Primary Examiner—Melvyn J. Andrews
Attorney, Agent, or Firm—Cooper & Dunham

[57] ABSTRACT

A system for cooling non-ferrous metal dross comprises an open-top metal pan to receive the dross which pan is divided by internal partitions into open-top compartments and has sufficient heat capacity to act as a heat sink to absorb heat from the dross, and a hood shaped to fit over the pan when filled with dross to form a substantially closed cavity round the pan. An inert gas such as argon is introduced into this cavity to displace oxygen and reduce the extent of oxidation of residual metal in the dross.

8 Claims, 4 Drawing Sheets

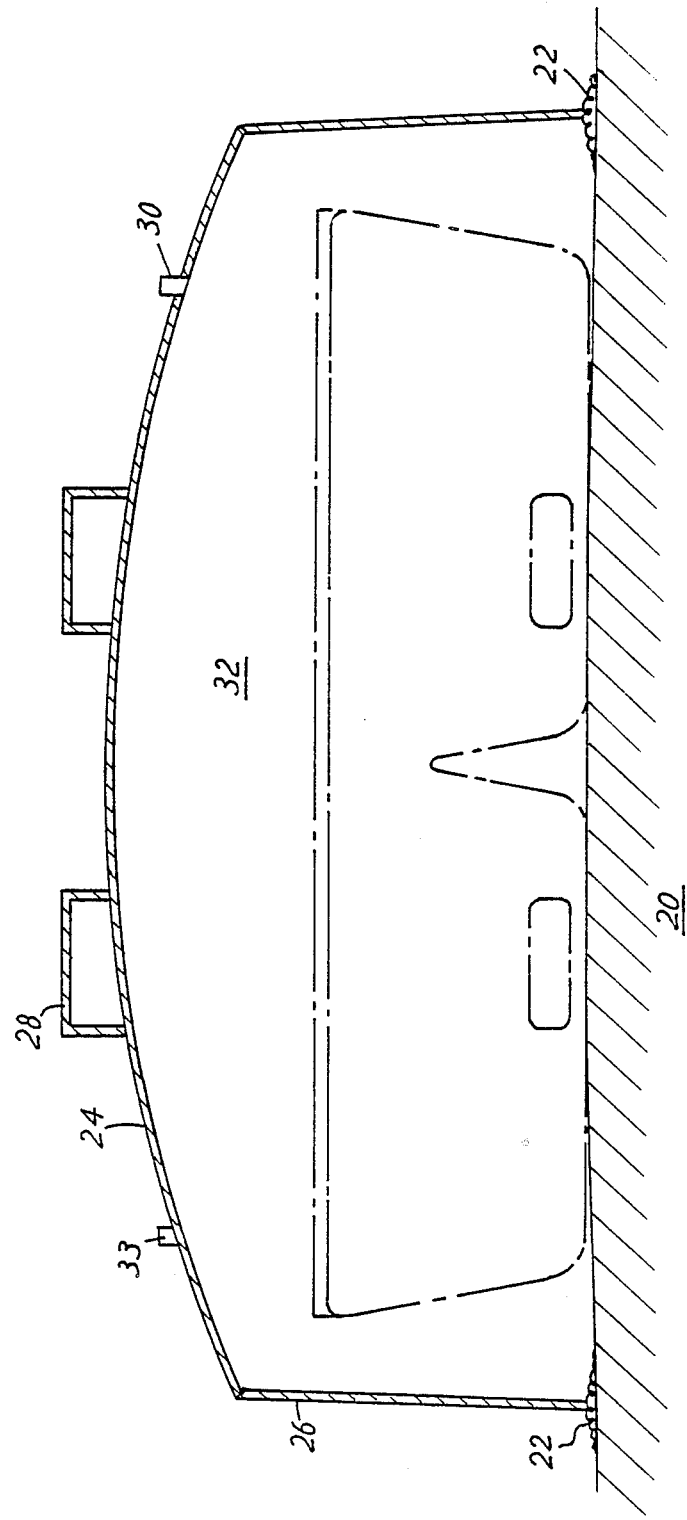

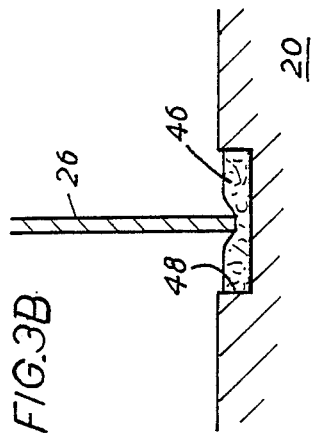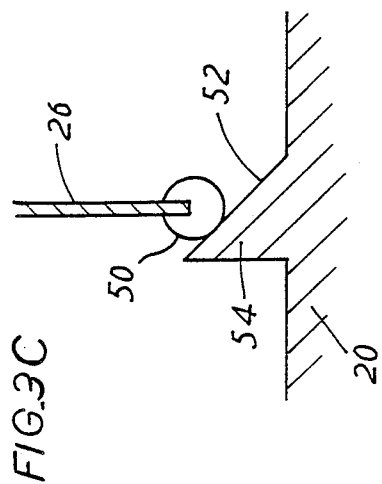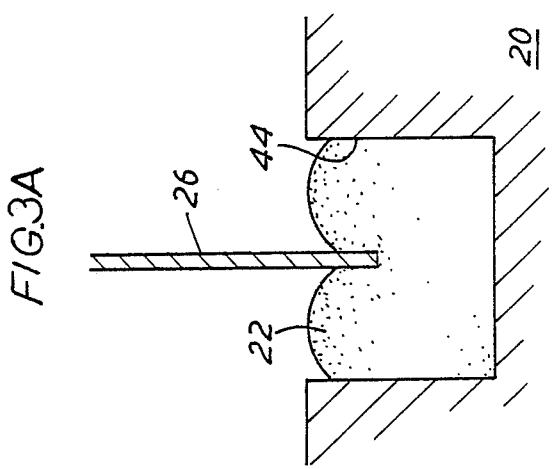

DROSS COOLING APPARATUS

This invention relates to an apparatus and method for cooling non-ferrous metal dross. Furnace skim or dross is a normal by-product of operations involving molten metal. The dross recovered from the surface of molten metal contains free metal, usually in concentrations sufficiently large to be worth recovering. It is hot, often glowing, and may be fuming and/or giving off smoke. It is advantageous to treat such dross so as to cool it in an acceptabale short time down to a temperature where it no longer undergoes a self-propagating exothermic reaction and can be safely and easily manipulated. A treatment system should:

(a) arrest quickly or control dross fumes and/or smoke;

(b) retain as much free metal as possible from the original content in the hot dross. If uncontrolled, the fine, free metallic particles in hot dross continue to oxidize, and the resulting heat propagates further metal consumption;

(c) cater for the different amounts of dross generated by an individual (e.g. furnace) or total (e.g. casting centre) operation involving molten metal;

(d) provide cooled dross in a form from which residual metal can readily be recovered;

(e) cool the dross safely;

(f) be simple to use and maintain;

(g) be inexpensive to purchase and operate.

Several methods have been used for dross cooling. One involves spreading the dross over a metal floor. This has the effect of cooling the dross, but it does not entirely prevent consumption of the residual metal nor the production of fumes or smoke. Because of increased environmental restrictions, existing installations must be fitted with expensive scrubbers to handle emissions. The lower efficiency in terms of metal retained against capital outlay required make new installations of this kind economically unattractive.

A second method, rotary coolers, comprise a horizontally rotating and externally cooled steel drum through which the dross is passed. Because of their simplicity in use and their effectiveness to cool dross down rapidly, rotary coolers have achieved considerable success. Nevertheless, they have disadvantages, particularly for larger installations. A back-up system is required in case the rotatary cooler should fail or require servicing. The capital expenditure involved is fairly high. Processing of wet (high metal content) drosses can be troublesome necessitating dross pre-treatment or alternative cooling systems. Finally, a large percentage of the cooled dross is inevitably produced as fines, from which the efficient and economic recovery of residual metal may be difficult.

Pan cooling in its simplest form involves simply loading the dross into a steel or other bucket. In this form, the cooling system does not meet many of the criteria outlined above. The present invention concerns an improved pan cooling system.

U.S. Pat. No. 4,097,027 describes a pan cooling system comprising a container for holding the dross positioned on a base surrounded by a moat containing water; and an open-bottomed bell to be lowered over the container until the skirt of the bell is immersed in the water in the moat. As the oxygen in the space between container and bell is consumed, by reaction with residual metal in the dross, the pressure falls and water rises round the container and acts as a heat sink for cooling of the dross. One disadvantage of the system is that it is only partly effective to reduce loss of residual metal in the dross; indeed, the system requires a certain amount of metal consumed in order the generate the required low pressure. Another disadvantage is that, as a result of the use of a water seal, water vapour is present in the atmosphere within the bell and constitutes a potential explosion hazard. Water vapour is reduced by e.g. metallic aluminium to hydrogen which can explode when the bell is lifted and air allowed back into contact with the dross.

This explosion problem is recognised in German DOS 3040718 which concerns essentially the same system. To avoid it, the bell is flushed with argon gas prior to being lifted out of the water.

The present invention avoids the explosion problem in a simpler and more satisfactory way by avoiding the use of a water seal. According to the invention, a system for cooling dross comprises an open-top pan to receive the dross and an outer vessel. The pan is divided by internal partitions into open-top compartments and is formed of metal of sufficient heat capacity to act as a heat sink and rapidly cool the dross; the outer vessel is shaped to fit over and round the pan when filled with dross to form a substantially closed cavity round the dross. An inert gas, such as argon, is introduced into this cavity so as to displace air and reduce the extent of reaction, mainly oxidation, of residual metal in the dross.

The invention is useful for the treatment of dross of any non-ferrous metal that melts at a relatively low temperature, such as magnesium or zinc. It is particularly suitable for the treatment of aluminium dross.

The overall length and width and depth of the open top pan are readily chosen for the specific location in which it is to be used. The pan is divided by internal partitions into open-top compartments. These partitions not only improve the thermal contact between the hot dross and the pan, but they also ensure that the cooled dross is recovered in the form of blocks of convenient handling size. The pan is preferably formed of cast steel or cast iron, most preferably cast steel, of sufficient thickness to have the desired heat capacity for cooling the dross. A suitable wall thickness is likely to be in the range 1 to 5 cm.

The ratio of the weight of the open-top pan to the weight of dross required to fill it is preferably at least 1:1. This is sufficient to ensure that the pan has sufficient heat capacity to act as a heat sink to absorb the heat evolved by the dross when cooling from the temperature of removal from the furance down to a temperature just below the solidus temperature of the pure metal (659° C. in the case of aluminium), assuming no losses. In practice, a margin of safety is generally required to bring the dross below the solidus temperature of the low melting point phases contained within the particular alloy, and it is therefore preferred that the ratio of pan weight to dross weight be from 1.5:1 to 2:1.

Of the cooling of the dross down to a safe temperature at which it is no longer reactive (for aluminium dross, e.g. below 400° C.), the major part e.g. 60 to 85% is preferably done by heat exchange with the open-top pan. For this purpose, the dimensions of the compartments of the pan are preferably such that no dross is more than 0.5 m from the nearest surface of the pan. The open-top pan should generally have a surface area exposed to dross of at least 5.0 m$^2$, preferably at least 9.0 m², for every cubic metre of capacity of the pan. As a result, cooling of the aluminium dross to a safe temperature is generally completed within a maximum period of twelve hours, the actual period depending on the metal content of the dross and the major alloying constituents presents. We have demonstrated in tests that one ton lots of partially incandescent (yellow heat) aluminium drosses can be safely cooled to below 400° C. in well under four hours. The dross can be removed at this stage without necessarily waiting for it to reach thermal equilibrium with the pan.

Another part of the equipment is an outer vessel shaped to fit over and round the pan when filled with dross to form a substantially closed cavity round the pan. One embodiment is an open-bottomed hood, shaped to cover the dross-filled pan and to be lowered over it. Another embodiment is a front-loading container, provided with a door, into which a pan filled with dross can be loaded.

A hood is shaped to cover the pan and form a substantially closed cavity round the dross filled pan. To minimize use of inert gas, it should preferably be no larger than is necessary for this purpose. It may be made of steel or other metal of sufficient weight and strength to counteract distortion by the heat of the dross. If the pan is positioned on a bed of sand (or other particulate material) or on a floor surrounded by a ring of sand, the hood may be lowered so that the bottom edge of the skirt becomes embedded in the sand so as to seal the cavity between hood and pan from the atmosphere. A sand seal of this kind not only avoids the dangers of the water seal used in the prior art, but also serves to ensure that loose debris about the base of the hood does not hinder its proper sealing.

Alternatively a gasket, e.g. of refractory wool or high temperature rubber, may be used to form the seal. The particular material or other gasket may be located in a depression in the floor. Or the hood may simply be arranged to rest on a solid floor, e.g. of refractory cement or metal. A metal floor may be artificially cooled in order to withdraw heat via the hood from the dross.

A front-loading container may be provided with a sealable door through which a pan loaded with dross may be introduced or removed. Containers may be provided with reinforced walls so that several can be stacked on top of one another where floor space is at a premium. At least part of the walls and roof of the container may be made double, and means provided for passing a cooling fluid (e.g. air) between them. This may be particularly desirable when the roof is subject to radiant heating by the dross.

The outer vessel is provided with a valve by which an inert gas can be introduced into the substantially closed cavity. The inert gas is preferably argon, but other gases such as nitrogen may be used where the nature of the metal dross permits. Nitrogen is reactive with molten aluminium metal and is therefore not preferred for use with aluminium dross. If necessary to displace oxygen rapidly from the cavity, an initial surge of inert gas may be used, followed by a slower steady flow rate. The optimum steady flow rate will depend on how well the hood when used is seated. If the dross is only slightly incandescent in part, an initial and steady-state flow of from 0.5 to 1 scfm has been used successfully.

As noted above, the bulk of the heat evolved by the dross is absorbed by the pan. The remainder is lost to the other vessel, the ground, and to the inert gas. A small further benefit can be obtained by circulating the inert gas between the closed cavity and a heat exchanger. However, this arrangement is considered relatively expensive and is unlikely to be cost-effective in most cases.

After cooling, the dross is removed from the pan and treated by conventional means to recover residual metal or merely for disposal. The size of the compartments of the open-top pan have been chosen to provide blocks of dross of a convenient size for further processing. By virtue of the lack of mechanical action on it during cooling, the dross contains a relatively small proportion of fines, so that recovery of the bulk of the unreacted metal is technically simple and economic. In trials, we have recovered more than 80% of the unreacted aluminium metal from dross cooled according to this invention. By contrast, when dross is spread on a metal floor in a dross room, or cooled by means of a rotary cooler, it is generally economically possible to recover typically only 65 to 75% of the unreacted metal. Furthermore, a higher proportion of aluminium metal generally remains unreacted when dross is cooled according to this invention, than is the case when the dross is cooled in a dross room.

Reference is directed to the accompanying drawings in which:

FIG. 2 is a side elevation of the pan with a hood in position over it;

FIGS. 3A, 3B and 3C are details of FIG. 2, showing different arrangements for sealing the skirt of the hood;

Figure 1:
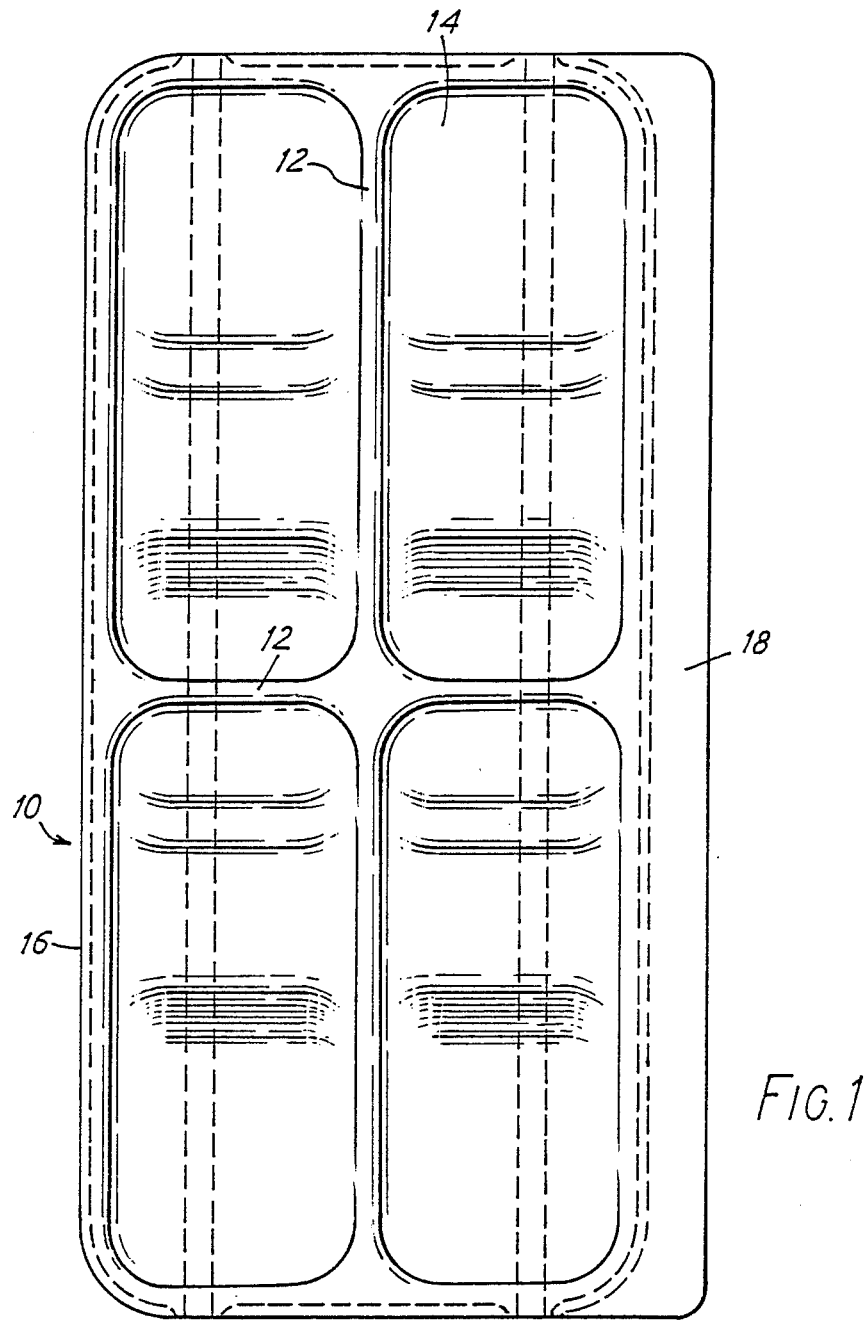
FIG. 1 is a plan view of an open-top pan to receive dross.

Referring to FIG. 1, a pan 10 for cooling dross is formed of cast steel 3.75 cm thick and is divided by internal partitions 12 into four compartments 14, each compartment measuring 100 cm long by 42 cm wide by 42 cm deep. The top edge of the partitions 12 is at substantially the same height as the rim 16 of the pan. Along one long edge, the pan has a lip 18 to assist transfer of dross from the surface of the molten metal.

In FIG. 2, the pan is shown positioned on a concrete floor 20 and surrounded by a ring of sand 22. A hood comprises a domed top 24 and a depending skirt 26, the bottom edge of which is seated in the ring of sand 22. In hood, which is formed of 4.5 mm sheet steel, is equipped with two lifting handles 28 and is 2.5 m long by 1.4 m wide by 1 m high. The hood is equipped with a valve 30 by means of which an inert gas such as argon may be introduced into the substantially closed cavity 32 between the pan and the hood. A pressure relief valve 33 is also provided.

FIGS. 3A, 3B and 3C show in more detail the seal formed between the skirt 26 of the hood and the concrete floor 20 of the cooling room.

In FIG. 3A, a bed of sand 22 is positioned in a channel 44 in the floor shaped to receive the bottom edge of the skirt. In FIG. 3B, a pad 46 of refractory wool is positioned in a channel 48 to receive the bottom edge of the skirt. In FIG. 3C, the bottom edge of the skirt 26 carries a refractory fibre gasket 50 which rests on the sloping surface 52 of a tooth-shaped ridge 54 on the floor to prevent accumulation of debris.

Figure 4:
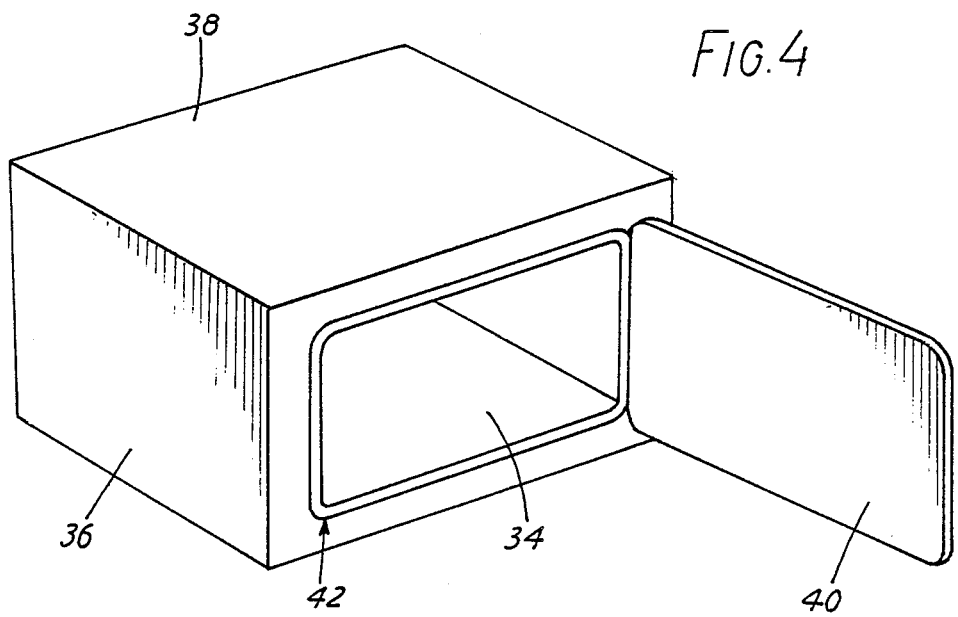
FIG. 4 is a perspective view of a front-loading container to receive a pan loaded with dross.

FIG. 4 shows a front-loading container having a floor 34, side walls 36, a roof 38, and a hinged door 40 sealed by a gasket 42. The door cavity is large enough to receive an open-top pan fully loaded with dross. As noted above, the walls may be reinforced to enable several containers to be stacked on top of one another. The side walls 36 and particularly the roof 38 of the container may be double-skinned to permit forced-air cooling of the walls. The container is equipped with a valve (not shown) by means of which an inert gas such as argon may be introduced into the substantially closed interior thereof.

Figure 5:
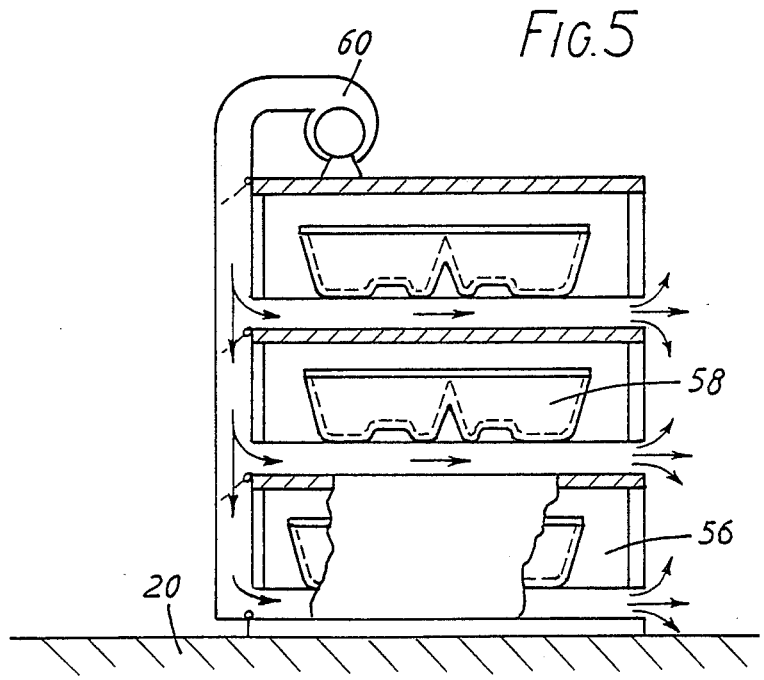
FIG. 5 is a front elevation of a stack of three containers with dross pans inside.

FIG. 5 shows a stack of three containers 56 each holding an open-top dross pan 58. The containers are spaced from one another and from the floor 20, and a pump 60 provides forced-air cooling around and below each container.

We claim:

1. Apparatus for cooling non-ferrous metal dross comprising an open-top pan to receive the dross and an outer vessel, the pan being having internal partitions that divide the pan into open-top compartments and being formed of metal of sufficient heat capacity to act as a heat-sink to absorb heat from the dross, and the outer vessel being shaped to fit over and round the pan when filled with dross to form a substantially closed cavity round the pan, there being provided means for introducing an inert gas into the said cavity so as to reduce the extent of reaction of free metal in the dross.

2. Apparatus as claimed in claim 1, wherein the pan is formed of cast steel or cast iron.

3. Appartus as claimed in claim 2, wherein the steel has a thickness of from 1 to 5 cm.

4. Apparatus as claimed in claim 1, wherein the outer vessel is a hood having a depending skirt, with a bottom edge, said bottom edge being shaped to seal on a support so as to substantially seal the cavity round the pan.

5. Apparatus as claimed in claim 1, wherein the outer vessel is a front-loading container.

6. Apparatus as claimed in claim 5, wherein said front-loading container has walls and a roof, at least part of which are double; and further including means for passing a cooling fluid therethrough.

7. Apparatus as claimed in claim 1, wherein said pan has a weight, and said open-topped compartments are dimensioned to hold a cumulative weight of dross when filled, such that the ratio of the weight of said pan to said cumulative weight of dross is at least 1:1.

8. Apparatus as claimed in claim 1, wherein the open-top pan has a surface area exposed to dross of at least 5.0m$^2$ for every cubic meter of capacity of the pan.

* * * * *